(12) United States Patent
Kim

(10) Patent No.: US 8,758,104 B2
(45) Date of Patent: Jun. 24, 2014

(54) SYSTEM AND METHOD FOR TRANSMITTING P2P MESSAGE IN MULTI-ACCESS ONLINE GAME

(75) Inventor: Seonghun Kim, Seoul (KR)

(73) Assignee: Intellectual Discovery Co., Ltd., Seoul (KR)

( * ) Notice: Subject to any disclaimer, the term of this patent is extended or adjusted under 35 U.S.C. 154(b) by 1356 days.

(21) Appl. No.: 11/843,064

(22) Filed: Aug. 22, 2007

(65) Prior Publication Data

US 2008/0051200 A1    Feb. 28, 2008

(30) Foreign Application Priority Data

Aug. 24, 2006  (KR) .................. 10-2006-0080733

(51) Int. Cl.
*A63F 13/00*    (2014.01)
(52) U.S. Cl.
USPC ............................ 463/6; 463/42
(58) Field of Classification Search
CPC ............. A63F 13/12; A63F 2300/408; H04L 29/06034
USPC ...................................... 463/6, 42
See application file for complete search history.

(56) References Cited

U.S. PATENT DOCUMENTS

| 2005/0054447 | A1* | 3/2005 | Hiroyama et al. | .............. 463/42 |
| 2005/0071481 | A1* | 3/2005 | Danieli | ........................ 709/229 |
| 2006/0154713 | A1* | 7/2006 | Sunazuka et al. | ................. 463/6 |

FOREIGN PATENT DOCUMENTS

| JP | 11-252-124 | 9/1999 |
| JP | 2001-345809 | 12/2001 |
| JP | 2005-095601 | 4/2005 |
| JP | 2005-100419 | 4/2005 |
| JP | 2005-524920 | 8/2005 |
| WO | 01/57678 | 8/2001 |

OTHER PUBLICATIONS

S. Douglas, E. Tanin, A. Harwood and S. Karunaskera, "Enabling Massivley Multi-Player Online Gaming Applications on a P2P Architecture" in Proceedings of the International Conference on Information and Automation, Dec. 15-18, 2005. 6 pages.*
B. Knutsson, H. Lu, W. Xu and B. Hopkins, "Peer-to-Peer Support for Massively Multiplayer Games", in IEEE INFOCOM 2004. 12 pages.*
Japanese Office Action issued on Jul. 13, 2010 for corresponding Japanese Application No. 2007-217732.

* cited by examiner

*Primary Examiner* — Lawrence Galka
(74) *Attorney, Agent, or Firm* — H.C. Park & Associates, PLC

(57) ABSTRACT

A system and method for transmitting a P2P message in a multi-access online game is disclosed. The system includes a game server for receiving game messages from a first user client, processing the received game messages, and transmitting game messages, needed to be transmitted to a second user client, to the second user client; and a database (DB) server for receiving status change information, and storing the received status change information in a database, wherein the game server, upon receiving a request of the second user client, having received a game message from the first user client as a P2P message, blocks the game message from being transmitted to the second user client. Therefore, some parts of transmission messages of the game server are transmitted or received as the P2P messages by the user clients, resulting in reduction of load at the game server.

11 Claims, 9 Drawing Sheets

SYSTEM AND METHOD FOR TRANSMITTING P2P MESSAGE IN MULTI-ACCESS ONLINE GAME

CROSS-REFERENCE TO RELATED APPLICATION

This application claims the benefit of Korean Patent Application No. 10-2006-0080733, filed on Aug. 24, 2006, which is hereby incorporated by reference as if fully set forth herein.

BACKGROUND

1. Field of Invention

The present invention relates to a multi-access online game, and more particularly to a system and method for transmitting a game message in a multi-access online game.

2. Description of the Related Art

Recently, online games and associated technologies have intensively attracted considerable attention as the next-generation growth engine. The importance of the above-mentioned online games in all kinds of game markets and the possibility of developing the online game technology are rapidly increasing every year. With the lapse of the above-mentioned situations, conventional game-associated companies have taken interests in the online game and associated technologies, and have established long-term plans to progress smoothly their businesses, such that many companies or enterprises are conducting intensive research into the online game markets.

Particularly, a multi-access online role-playing game from among the above-mentioned online games enables a plurality of gamers to use or modify environments provided from game developers, so that the gamers can create stories and structures of games. In this way, it should be noted that the above-mentioned multi-access online role-playing games are considered to be a representative specified game.

There are a variety of multi-access online role-playing games, for example, "Diablo" and "World of Warcraft" of Blizzard, "Lineage" of NCsoft, and "Ultima Online" of ORIGIN, etc.

Generally, the above-mentioned multi-access online role-playing game has provided users with a fantasy-based world (i.e., simulated environments). However, in recent times, the world of the multi-access online role-playing game has become more diverse, for example, general cities or schools.

The multi-access online role-playing game has been conducted by interaction between one player and other players, so that a game command message of any one of the users must be transmitted to other users. The transmission of the game command message greatly affects a load of the multi-access online role-playing game server.

With the extension of the multi-access online role-playing game area, a racing game is modified into the multi-access online role-playing game, and is then provided to users or players. Character cars for use in the above-mentioned racing role-playing game move very fast or frequently collide with each other. Therefore, if the fast-moving information or collision information of the character cars is transmitted to users other than a playing user, an amount of load of the game server may be rapidly increasing, resulting in the occurrence of fatal errors.

SUMMARY

One embodiment exemplarily described herein can be generally characterized as providing a system and method for transmitting a Peer-to-Peer (P2P) message in a multi-access online game, which can reduce an amount of load of a game server of a multi-access online role-playing game.

Another embodiment exemplarily described herein can be generally characterized as providing a system and method for transmitting a P2P message in a multi-access online game, which can allow user clients to transmit/receive some parts of transmission messages of the game server, resulting in reduction of load of the game server.

Yet another embodiment exemplarily described herein can be generally characterized as providing a system and method for transmitting a P2P message in a multi-access online game, which can select some messages needed to be real-time-processed, and enable the selected messages to be exchanged between user clients, so that the efficiency of using the P2P message in the multi-access online game is maximized.

Yet another embodiment exemplarily described herein can be generally characterized as providing a system and method for transmitting a P2P message in a multi-access online role-playing game, which can implement stable transmission/reception of P2P messages between the user clients.

Effects of the aforementioned embodiments can be accomplished by providing a system for transmitting a P2P (Peer-to-Peer) message in a multi-access online game in which a plurality of users participate to play the game. The system may include a game server for receiving game messages from a first user client, processing the received game messages according to a predetermined game logic, and transmitting game messages, needed to be transmitted to at least one second user client, to the at least one second user client; and a database server for receiving status change information including a status change of a game character from the game server, and storing the received status change information in a database, wherein the game server, upon receiving a request of the second user client, which has received a predetermined game message selected from the game messages, from the first user client as a P2P message, blocks the predetermined game message from being transmitted to the second user client.

The game server may transmit character location information of the second user client to the first user client so that the first user client can select the second user client by which the predetermined game message is to be transmitted as the P2P message.

The predetermined game message is needed to be immediately transmitted to the second user client.

If the multi-access online game is a racing-associated game, the message needed to be immediately transmitted includes moving- and collision-messages of character cars.

The game server includes a player object, in which the player object is generated or removed for each user client accessing the game server, and transmits/receives the game message to/from the user client accessing the game server.

The system may further include a real-time message processing server for processing a real-time game message having a high necessity indicating that the real-time game message is needed to be immediately transmitted to the second user client, and the game server conducts a non-realtime game message having a low necessity indicating that the non-realtime game message from among the game messages has almost no need to be immediately transmitted to the second user client and is needed to be reflected in the DB server.

In one embodiment, there is provided a method for transmitting/receiving a P2P message in a multi-access online game in which a plurality of user clients gain access to a game server over a network to play the game, and the method is implemented in a game application installed in the user clients. The method may include selecting other user clients at which the P2P message will be received; determining whether a game message generated by the game application is a predetermined message to be transmitted according to a P2P scheme, and if the generated game message is identical with the predetermined message, transmitting the generated game message to the selected user clients according to the P2P scheme.

In another embodiment, there is provided a computer-readable recording medium. The computer-readable recording medium may include a program for executing the above-mentioned method, so that data of the program can be read by a digital data processor.

In another embodiment, there is provided a computer-readable recording medium equipped with a game application installed in a plurality of user clients to transmit a P2P message in a multi-access online game in which a plurality of user clients gain access to a game server over a network to play the game. The computer-readable recording medium may include a command interpreter for interpreting game command information inputted by a user; a game logic processor for executing a predetermined game logic according to the interpreted result of the command interpreter; a server communication unit for transmitting game messages generated by the game logic processor to the game server, receiving the game messages from the game server, and transmitting the received game messages to the game logic processor; and a P2P transceiver for transmitting a predetermined game message from among the game messages to other user clients, and receiving the P2P message from the other user clients.

BRIEF DESCRIPTION OF THE DRAWINGS

The above and other features of embodiments exemplarily described herein will become more apparent after reading the following detailed description when taken in conjunction with the drawings, in which.

DETAILED DESCRIPTION

Figure 1:
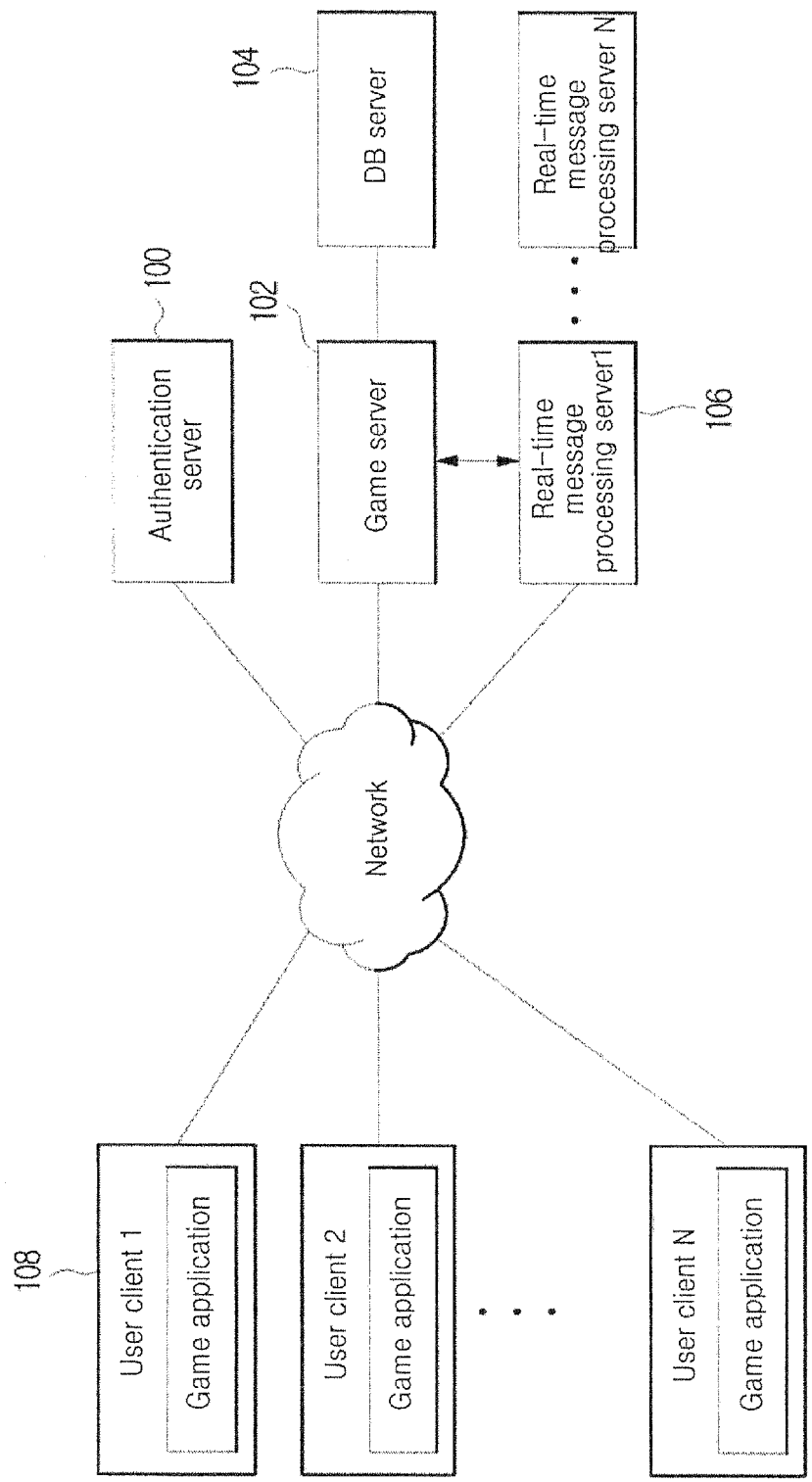
FIG. 1 is a block diagram illustrating a multi-access online game system based on a system and method for transmitting/receiving a P2P message according to one embodiment.

Now, exemplary embodiments will be described in detail with reference to the annexed drawings. In the drawings, the same or similar elements are denoted by the same reference numerals even though they are depicted in different drawings. In the following description, a detailed description of known functions and configurations incorporated herein will be omitted when it may make the subject matter of the present invention rather unclear.

A system and method for transmitting P2P messages in a P2P-based multi-access online game system will hereinafter be described in detail.

FIG. 1 is a block diagram illustrating a multi-access online game system based on a system and method for transmitting/receiving a P2P message according to one embodiment.

Preliminarily, it should be noted that the P2P message transmission system and method can be applied to a variety of multi-access online games, and FIG. 1 shows but one example of the multi-access online game system capable of being applied to the embodiments described herein.

The embodiments exemplarily described herein can be applied to a variety of multi-access online games. Specifically, the effects of the embodiments exemplarily described herein can be maximized in the case of a multi-access online role-playing game in which a fast moving player character moves to transmit a plurality of messages.

For the convenience of description and better understanding, an exemplary case in which the above-mentioned P2P message transmission system and method is applied to the multi-access online role-playing racing game will hereinafter be described in detail. However, it should be noted that the scope and spirit of the present invention, as defined by the claims, is not applied to only the above-mentioned example, but can also be applied to not only a multi-access online role-playing racing game but also a variety of multi-access online games capable of enabling player characters to exchange their status information with each other.

Referring to FIG. 1, the multi-access online game system to which the above-mentioned P2P message transmission system and method is applied may include an authentication server 100, a game server 102, a database (DB) server 104, and a plurality of real-time message processing servers 106.

The authentication server 100 authenticates whether a user who desires to access the game system is an authorized user who has the authority of accessing the game system.

The authentication sever 100 receives authentication request information from the user client 108, and determines whether the authentication request of the user client 108 is valid or not. The authentication request information may, for example, include a user ID and a password, and the authentication server 100 determines whether the ID and password contained in the authentication request information is valid or not.

In order to determine whether the ID and password of the user is valid, the authentication server 100 may communicate with the DB server 104, or may communicate with other DBs (not shown) storing authentication information.

In order to perform the aforementioned authentication between the user client 108 and the authentication server 100, not only the above-mentioned authentication based on the ID/password information, but also a variety of authentication methods well known to those skilled in the art, can also be employed.

If it is determined that the authentication request information of the user client 108 is valid, the authentication server 100 permits a corresponding user client 108 to access the game server 102.

The game server 102 processes game messages of the user client 108, and controls the progression of game. The game server 102 receives a variety of game messages, for example, game command messages such as attack or moving messages of player characters, chatting messages between user clients 108, quest messages such as quest-acceptance or completion, and status information messages such as level-up or item acquisition of the player characters, so that the game server 102 conducts the received game messages according to a predetermined game logic.

For example, upon receiving the attack message against a specific object from the user client 108, the game server 102 transmits attack information against the specific object to other user clients 108.

In another example, upon receiving the status information message such as the level-up message of each player, the game server 102 transmits the level-up information of the user to the DB server 104, so that it updates level information of the corresponding user with new information.

In the case of the multi-access online racing game, the game server 102 may provide simulation information of situations encountered during the game. For example, if player character cars collide with each other or an unexpected collision between the character car and the NPC (None Player Character) car occurs, the game server 102 provides associated user clients 108 with simulation information caused by the collision.

Specifically, the game server 102 transmits event information created by a specific user to other user clients, so that a plurality of users can share a variety of events (e.g., status change-, attack-, collide-, and moving-messages of the player characters) encountered during the game with each other.

For example, if the player character car collides with the NPC car within a specific area, the game server 102 calculates simulation caused by the collision, and transmits the simulation calculation information to not only the user client 108 of the collided player character car, but also other user clients 108 of peripheral character cars capable of viewing the collision situation.

In other words, the game server 102 must transmit events created in specific player characters to the user clients 108 of peripheral player characters, so that it transmits event creation information associated with a single event to N user clients 108. This event creation information is one of the important factors aggravating a load of the game server 102.

Several real-time message processing servers 106 perform processing of messages needed to be real-time processed from among messages transmitted from the user clients 108.

According to one embodiment, information messages (e.g., character status information such as a character level-up or quest information) having the low necessity of being real-time transmitted to peripheral user characters, but which must be stored in the DB server 104, are processed by the game server 102.

For example, in the case of a specific game in which the character car moves fast as in the racing game and the collision between the character cars frequently occurs, provided that the moving message and the collision message are conducted by the real-time message processing server 106, the message-processing efficiency can be maximized.

In other words, the game server 102 and the real-time message processing server 106 share messages according to message categories, so that the messages can be effectively distributed to the game server 102 and the real-time message processing server 106.

However, the above-mentioned system and method for transmitting the P2P message in a multi-access online game described above is not limited to only the message-distributed processing system, but can also be applied to the system capable of conducting messages by a single game server.

The DB server 104 stores information associated with the game, replies to the request of the game server 102 or the user client 108, and provides the stored information to the game server 102 or the user client 108.

The DB server 104 may store status information of player characters, item information, and quest information, etc. If the DB server 104 receives character status-, item-, and quest-information from the game server 102, it stores corresponding information.

The game application for executing the game is installed into each user client 108 which gains access to the game system over the network. The user client 108 may include all kinds of devices, which can communicate with a target object over the network and can execute the game application. For example, the user client 108 may include personal terminals (e.g., a general PC, a notebook computer, a PDA, and a mobile phone, etc.).

As described above, most loads encountered by the online game are created by messages transmitted from the servers 102 and 106 to the user client 108, and there is needed a method for minimizing the number of message packets transmitted from the servers 102 and 106 to the client 108, and the size of the message packets.

According to some embodiments, predetermined messages from among messages relayed by the real-time message processing server 106 are directly exchanged between the user clients according to the P2P scheme.

In one embodiment, the directly-exchanged messages between the user clients 108 according to the P2P scheme is mainly processed by the real-time message processing server 106 so that the directly-exchanged messages are considered to be the highly real-time processing necessity by the real-time message processing server 106.

For example, the moving messages or collision messages created during the online racing game may be directly exchanged between the user clients 108 according to the P2P communication scheme. However, it should be noted that the scope and spirit of the P2P-based exchanged messages exemplarily described herein are not limited to the above-mentioned example, and it will be appreciated by those skilled in the art that the P2P-based exchanged message categories may become more diverse as necessary.

In order to more correctly display the moving status of a specific character car during the online racing game, the moving messages must be transmitted to a destination at intervals of a short period of time. However, due to the load problems of the game server 102 or the real-time message processing server 106, the game server 102 or the real-time message processing server 106 may have difficulty in transmitting the moving messages at intervals of a short period of time.

In the case of using the P2P message transmission, although the moving message which has been delivered at intervals of 0.5 second is delivered at intervals of 0.1 second, the game server 102 or the real-time message processing server 106 may not encounter excessive load, so that the above-mentioned problem is solved.

The system and method for allowing the P2P message to be exchanged between the user clients 108 in the online game will hereinafter be described with reference to the annexed drawings.

Figure 2:
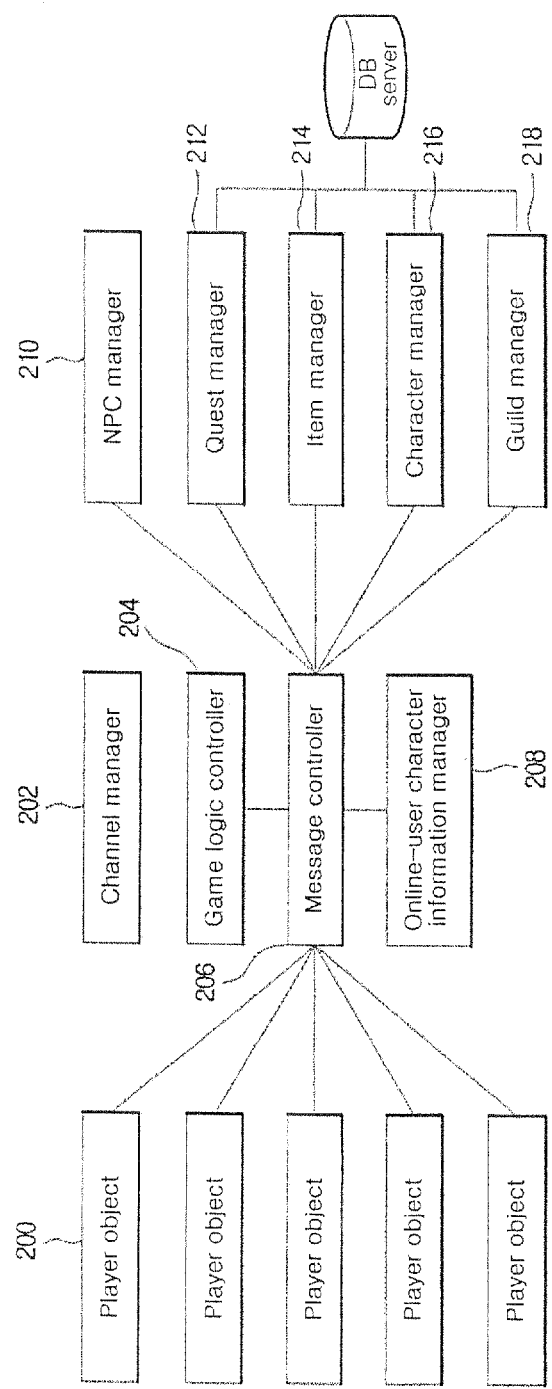
FIG. 2 is a block diagram illustrating modules of a game server according to one embodiment.

FIG. 2 is a block diagram illustrating modules of a game server according to an embodiment of the present invention.

Referring to FIG. 2, the game server 102 according to one embodiment may include a plurality of player objects 200, a channel manager 202, a game logic controller 204, a message controller 206, an online-user character information manager 208, an NPC manager 210, a quest manager 212, an item manager 214, a character manager 216, and a guild manager 218.

The player object 200 controls transmission/reception of messages between user clients 108 accessing the game server 102. If a user client 108 gains access to the game server 102, a player object 200 is created. If the connection between the game server 102 and the user client 108 is severed, the player object 200 disappears.

The player object 200 transmits game messages received from the user client 108 to the message controller 206. Upon receiving the game messages of the game server 102 from the message controller 206, the player object 200 transmits the received game messages to the corresponding user client 108.

The channel manager 202 forms a channel via which some users may participate in the multi-access online game, and manages the formed channel. For example, in the case of the multi-access online role-playing game, the channel manager 202 can create a channel through which some users can enjoy racing with others separately from the simulated environment implemented in the role-playing game.

The message controller 206 receives game-associated messages created by the user client 108 from the player object 200, and distributes the received messages to constituent components which will deal with the received message.

For example, if a wearing-item change message of a specific user character is received from the player object 200, the message controller 206 transmits the received wearing-item change message to the item manager 204 and the character manager 206. If the received message is a quest acceptance message of a specific user, the message controller 206 transmits a quest acceptance message to the quest manager 212.

If the message controller 206 desires to transmit a message to the accessed user client 108, it transmits the corresponding message to the player object 200 associated with the corresponding user client 108.

For example, if the chatting message for a specific user is received in the message controller 206, the message controller 206 transmits the chatting message to the player object 200 associated with a receiving user who receives the chatting message, so that the chatting message can be transmitted to the corresponding user client 108.

In another example, upon receiving a collision message of a specific user character car, the message controller 206 determines users of character cars located at points at which the user can view the collision, and transmits the collision scene and the simulation information associated with the collision to the corresponding user clients 108.

The online user character information manager 208 manages character information of online users who access the game server 102. The character information of online users may include details information of the characters, for example, location-, level-, and item-information of the online user characters.

The information of the online user character information manager 208 is used when the message controller determines information of a message receiver. For example, if a specific user changes a current character-wearing item to another item, the wearing-item change information must be transmitted to peripheral users other than the specific user.

In this case, the message controller 206 extracts peripheral user characters other than the specific user character, who has changed the wearing item to another item, using the information managed by the online user character information manager 208, and transmits a wearing-item change message to the player objects 200 of the corresponding user characters.

In another example, if a specific user character moves to another location, the message controller 206 extracts peripheral user characters other than the above character has moved from the online user character information manager 208, and transmits the moving message to the player object 200 corresponding to the above user character.

If the message controller 206 receives status change messages (e.g., moving messages, wearing-item change messages, collision messages, etc.) of a specific user character, it transmits the status change information to the online user character information manager 208, such that it manages the status information of the online-mode character.

The NPC manager 210 manages NPC information appearing in the game. For example, in the case of the racing game, the NPC manager 210 manages NPC information for quest provision, and information of any traffic car appearing in the game. In the case of a typical multi-access online role-playing game, the NPC manager may include information of any monster appearing in each area.

The quest manager 212 manages quest information provided to users in the multi-access online game, and also manages quest acceptance- or quest completion-information.

If a specific user accepts a specific quest, the quest acceptance message is transmitted to the message controller 206, and the message controller 206 transmits the quest acceptance message to the quest manager 212.

The quest manager 212 transmits the quest acceptance information to the DB server 104, so that the quest acceptance information is reflected in the DB server 104. In the case of the quest completion message, the quest completion message is reflected in the DB server 104 by the quest manager in the same manner as in the above quest acceptance message.

The item manager 214 manages not only information of items created during the game, but also user-character item change information (e.g., item acquisition or item drop) of the user character.

If a specific user character acquires the item, the item acquisition message is transmitted to the message controller 206, and the message controller 206 transmits the item acquisition message to the item manager 204. The item manager 214 transmits the item acquisition information to the DB server 104, so that the item acquisition information can be reflected in the DB server 104.

The character manager 216 manages information of characters created by the users, receives status-change messages of the characters, and transmits the received status-change messages (e.g., a character level-up message and item acquisition information) to the DB server 104.

The guild manager 218 manages information of a guild created by the multi-access online game users. The guild manager 218 receives guild-associated messages, for example, registration/withdrawal messages of guild members and level-change messages of the guild members. And, the guild manager 218 transmits the guild-associated information contained in the received message to the DB server 104. If there is guild-associated quest information such as a guild-member status or guild-member name, the guild manager 218 communicates with the DB server 104 to provide guild information.

Figure 3:
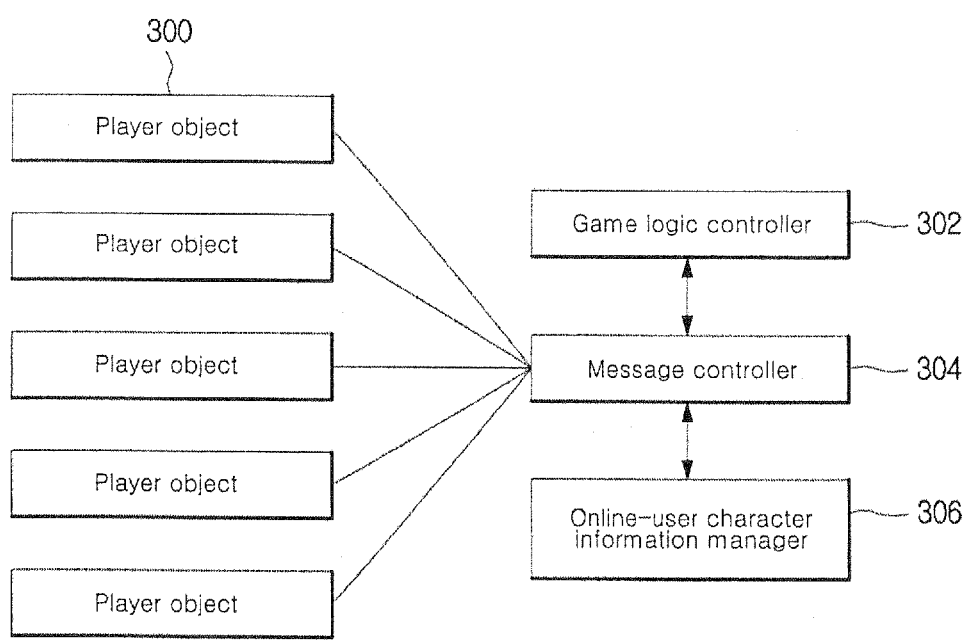
FIG. 3 is a block diagram illustrating a real-time message processing server according to one embodiment.

FIG. 3 is a block diagram illustrating a real-time message processing server according to one embodiment.

Referring to FIG. 3, the real-time message processing server 106 according to one embodiment may include a player object 300, a game logic controller 302, a message controller 304, and an online user information manager 306.

As stated above, the real-time message processing server 106 is adapted to share roles of the game server 102, and conducts messages (e.g., collision messages) needed to be immediately transmitted to a destination.

Therefore, the real-time message processing server 106 may include some parts of constituent components of the game server 102. However, the real-time message processing server 106 may not include the quest manager 212, the item manager 214, the character manager 216, and the guild manager 218, which are needed to communicate with the DB server 104.

However, the real-time message processing server 106 may conduct the messages reflected in the DB server 104 as necessary. In this case, the real-time message processing server 106 includes all the constituent components, so that it may have the same structure as that of the game server 102.

The roles of individual constituent components of the real-time message processing server 106 are the same as those of the game server 102, so that their detailed description will herein be omitted for the convenience of description.

Upon receiving the moving message needed to be processed in real time, the message controller 304 extracts information of an online user character who will receive the moving message using the information of the online user character information manager 306. The message controller 304 transmits the moving message to the player object 300 corresponding to the online user who will receive the moving message. The player object 300 transmits the moving message to the corresponding user.

Figure 4:
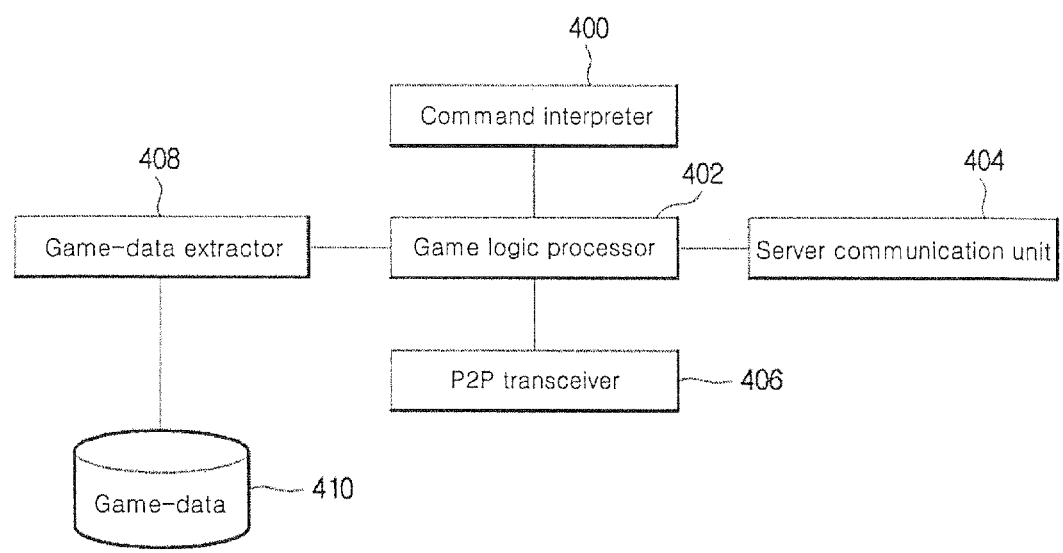
FIG. 4 is a block diagram illustrating a game application installed into a user client according to one embodiment.

FIG. 4 is a block diagram illustrating a game application installed in a user client according to one embodiment.

Referring to FIG. 4, the game application according to the present invention may include a command interpreter 400, a game logic processor 402, a server communication unit 404, a P2P transceiver 406, and a game-data extractor 408.

The command interpreter 400 receives game command information inputted by the user, interprets the game command, and transmits the interpreted information to the game logic processor 402. For example, the game command interpreter 400 determines whether the user-entry game command is a quest acceptance command or a moving command, and transmits the interpreted information to the game logic processor 402.

The game logic processor 402 executes a predetermined game logic according to the game command inputted by the user.

If the game command has no need to be transmitted to the servers 102 and 106 as in the game environment setup command, the game logic processor 402 conducts a game environment setup process in the client.

If the game command is determined to be a specific command needed to be transmitted to the servers 102 and 106 as the moving message, the game logic processor 402 creates a moving message corresponding to the moving command, and transmits the moving message to the server communication unit 404.

The server communication unit 404 transmits the game message created from the game logic processor 402 to the game server 102 or the real-time message processing server 106. And, the server communication unit 404 transmits the game message transmitted from the real-time message processing server 106 to the game logic processor 402.

The server communication unit 404 determines whether the message created from the game logic processor 402 is a first message to be transmitted to the game server 102 or a second message to be transmitted to the real-time message processing server 106, and transmits the game message to the determined server 102 or 106.

The game data extractor 408 extracts game data needed to execute the game. For example, upon receiving a control signal of the game logic processor 402 according to the user's game command, the game data extractor 408 extracts map data and character information data, and transmits the extracted data to the game logic processor 402.

The P2P transceiver 406 transmits or receives the P2P message to/from other user clients accessing the game. The P2P transceiver 406 directly transmits the message needed to be immediately transmitted to other user clients as the collision message to a corresponding user client, or receives the P2P message from other user clients.

The P2P transceiver 406 selects another user client who will receive the messages according to the P2P scheme, and transmits the P2P message to the selected user client to immediately transmit the moving message and so on. Since the moving information of the user character must be managed by the servers 102 and 106, the moving information is transmitted to the servers 102 and 106 as the P2P message, and the moving message, and the moving message is transmitted from the server communication unit 404 to the servers 102 and 106.

If the moving message of the user client "A" is transmitted to another user client "B" according to the P2P scheme, the user client "B" has no need to receive the moving message of the user client A from the servers 102 and 106.

In this case, the P2P transceiver of the game application contained in the user client "B" creates a cutoff request message for blocking transmission of the moving message transmitted from the user client "A", and transmits the cutoff request message to the servers 102 and 106.

If the servers 102 and 106 receive the above-mentioned cutoff request message, the moving message of the user client "A" is not transmitted to the other user client "B". Therefore, the number of messages for the user clients which encounter the largest load in the servers 102 and 106 can be effectively reduced.

Exemplary configurations and operations of the P2P transceiver will hereinafter be described with reference to FIG. 6.

Figure 6:
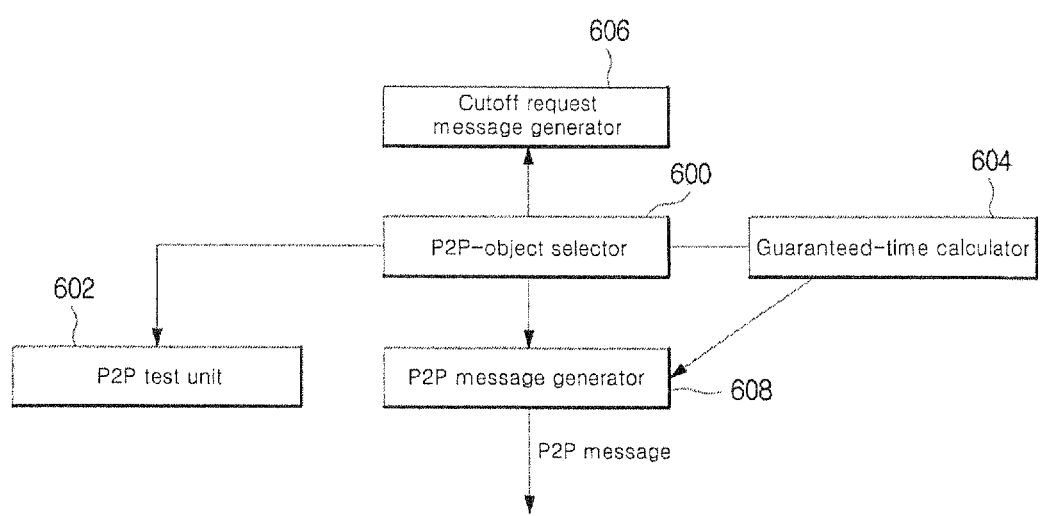
FIG. 6 is a block diagram illustrating modules of a P2P transceiver according to one embodiment.

FIG. 6 is a block diagram illustrating modules of the P2P transceiver according to one embodiment.

Referring to FIG. 6, the P2P transceiver according to one embodiment may include a P2P-object selector 600, a P2P test unit 602, a guaranteed-time calculator 604, a cutoff request message generator 606, and a P2P message generator 608.

The P2P-object selector 600 selects an object client needed to receive the P2P message from among several clients. According to one embodiment, the P2P-object selector 600 determines user clients of peripheral characters located in the vicinity of the client character transmitting the P2P message as the reception-object clients on the basis of location information of other user characters. A specific character spaced apart from character of the user client transmitting P2P message by a predetermined distance has the low necessity of real-time-viewing the moving- and collision-information of user client transmitting the P2P message, so that the P2P-object selector 600 primarily selects only the user clients of characters located within a predetermined distance as transmission objects of the P2P message.

The P2P test unit 602 tests whether the P2P reception object clients selected on the basis of the location information can receive the P2P message. If a firewall is installed or a network address translation (NAT) function is used in the P2P reception object clients, the P2P test unit 602 may have difficulty in smoothly transmitting the P2P message. In order to cope with the above-mentioned situation, the P2P test unit 602 tests whether the P2P message can be transmitted or received to/form the primarily selected reception object clients. The P2P test unit 602 may test whether the P2P message can be received using a method for transmitting a test signal.

The P2P-object selector 600 primarily selects the P2P reception-object client, and finally selects the P2P reception-object client according to the test result of the P2P test unit 602. In other words, the P2P-object selector 600 selects only some clients, capable of receiving the P2P message by the test of the P2P test unit 602, from among the primarily-selected P2P reception-object clients, and finally determines the selected clients to be the P2P reception-object clients.

The guaranteed-time calculator 604 calculates a guaranteed time of the P2P transmission during transmission of the P2P message. In this case, the guaranteed time indicates a predetermined time which it is guaranteed that the client transmitting the P2P message transmits the P2P message to the client receiving the P2P message.

The client transmitting the P2P message calculates a guaranteed time in consideration of a network connection status between the client transmitting the P2P message and the client receiving the P2P message and other factors, inserts the calculated guaranteed time information into the P2P message, and transmits the resultant P2P message. In this case, the guaranteed time may be denoted by a consumed time such as ~seconds, or may be denoted by an absolute time such as ~minutes and ~hours.

The guaranteed time is used as a time during which the client receiving the P2P message requests the message cutoff action from the servers 102 and 106. The client receiving the P2P message requests that the servers 102 and 106 blocks the moving message from being generated from the client transmitting the P2P message by the guaranteed time contained in the P2P message.

If the cutoff request message generator 606 receives the P2P message from other clients, it generates a cutoff request message using the guaranteed time contained in the P2P message.

Figure 8:
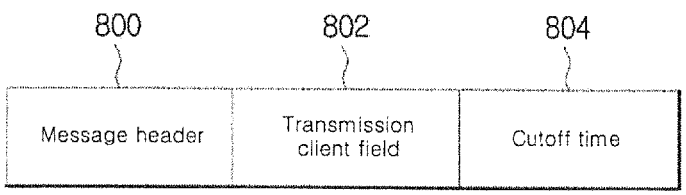
FIG. 8 is a conceptual diagram illustrating fields of a cutoff request message according to one embodiment.

FIG. 8 is a conceptual diagram illustrating fields of cutoff request message according to one embodiment.

Referring to FIG. 8, the cutoff request message according to the present invention may include a message header field 800, a transmission client field 802, and a cutoff time field 804.

The message header field 800 includes predetermined identification information via which the servers 102 and 106 can identify whether a corresponding message is a cutoff request message.

The transmission client field 802 includes specific information capable of identifying whether message transmission from any client is blocked or not. The transmission client field may record address information of the transmission client (e.g., IP address), and may record a variety of information capable of identifying other transmission clients.

The guaranteed time information contained in the P2P message is recorded in the cutoff time field 804. The servers 102 and 106 block transmission of a message supplied from the client recorded in the transmission client field by a predetermined time contained in the cutoff time field.

Referring to FIG. 6, the P2P message generator 608 generates the P2P message to be transmitted to the P2P reception-object client selected by the P2P-object selector, and then transmits the P2P message.

Figure 7:
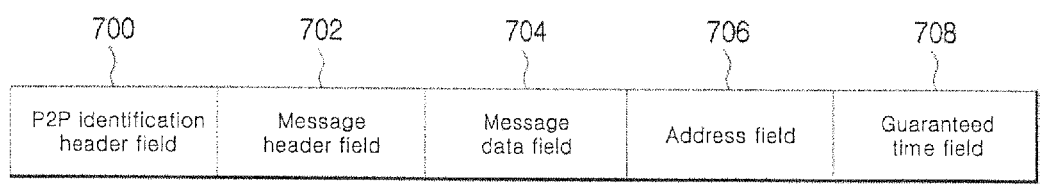
FIG. 7 is a conceptual diagram illustrating fields of a P2P message according to one embodiment.

FIG. 7 is a conceptual diagram illustrating fields of a P2P message according to one embodiment.

Referring to FIG. 7, the P2P message according to one embodiment may include a P2P identification header field 700, a message header field 702, a message data field 704, an address field 706, and a guaranteed time field 708.

The P2P identification header field 700 includes predetermined ID information capable of identifying whether a corresponding message is directly transmitted by the P2P scheme without passing through the servers 102 and 106.

The message header field 702 includes predetermined ID information for identifying message category information. For example, ID information for identifying whether the message is a moving message or collision message is recorded in the message header field 702.

The message data field 704 includes data information associated with the message category information. For example, if it is determined that the message is the moving message, coordinate information of a specific point to which the character moves may be contained in the message data field.

ID information of the P2P message transmission client is recorded in the address field 706. As described above, the address field 706 may have address information of the transmission client. The guaranteed-time field 708 includes guaranteed time information calculated by the guaranteed time calculator 604.

Information of the transmission client field 706 and information of the guaranteed time field 708 are used when the client receiving the P2P message generates the cutoff request message.

In order to transmit the P2P message to the reception-object client, the user must recognize the address information (e.g., IP address) of the reception-object client. According to one embodiment, the server 102 or 106 includes the address information of the reception-object client in the message associated with the reception-object client, such that it can correctly recognize the address information of the reception-object client. Otherwise, the user may request the address information of the reception-object client from the server 102 or 106, and may receive the requested address information from the server 102 or 106, so that the user can recognize the address information of the reception-object client.

According to one embodiment, the P2P message may be a UDP protocol packet. However, the P2P message is not limited to only the UDP protocol packet, and other protocol packets may also be applied to the P2P message.

Figure 5:
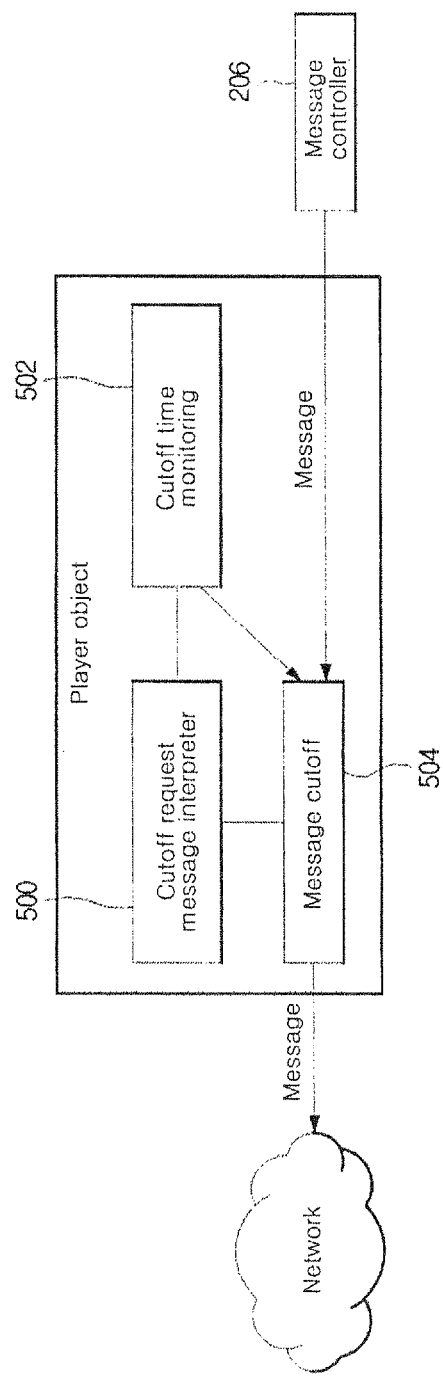
FIG. 5 is a block diagram illustrating modules of a player object according to one embodiment.

FIG. 5 is a block diagram illustrating modules of the player object according to one embodiment.

Referring to FIG. 5, the player object 200 or 300 may include a cutoff request message interpreter 500, a cutoff time monitoring unit 502, and a message cutoff unit 504.

Upon receiving the cutoff request message from the client accessing the server 102 or 106, the cutoff request message interpreter 500 interprets the received cutoff request message. The cutoff request message interpreter 500 analyzes the cutoff request message, and extracts a cutoff time and transmission client information for the message cutoff action.

Upon receiving the transmission client message contained in the cutoff request message from the message controller 206, the message cutoff unit 504 blocks a corresponding message.

The cutoff time monitoring unit 502 checks a cutoff time contained in the cutoff request message, and allows the message to be blocked during only the cutoff time. If the cutoff time is updated by the arrival of a new cutoff request message, the cutoff time monitoring unit 502 monitors the cutoff time according to the updated cutoff time.

Figure 9:
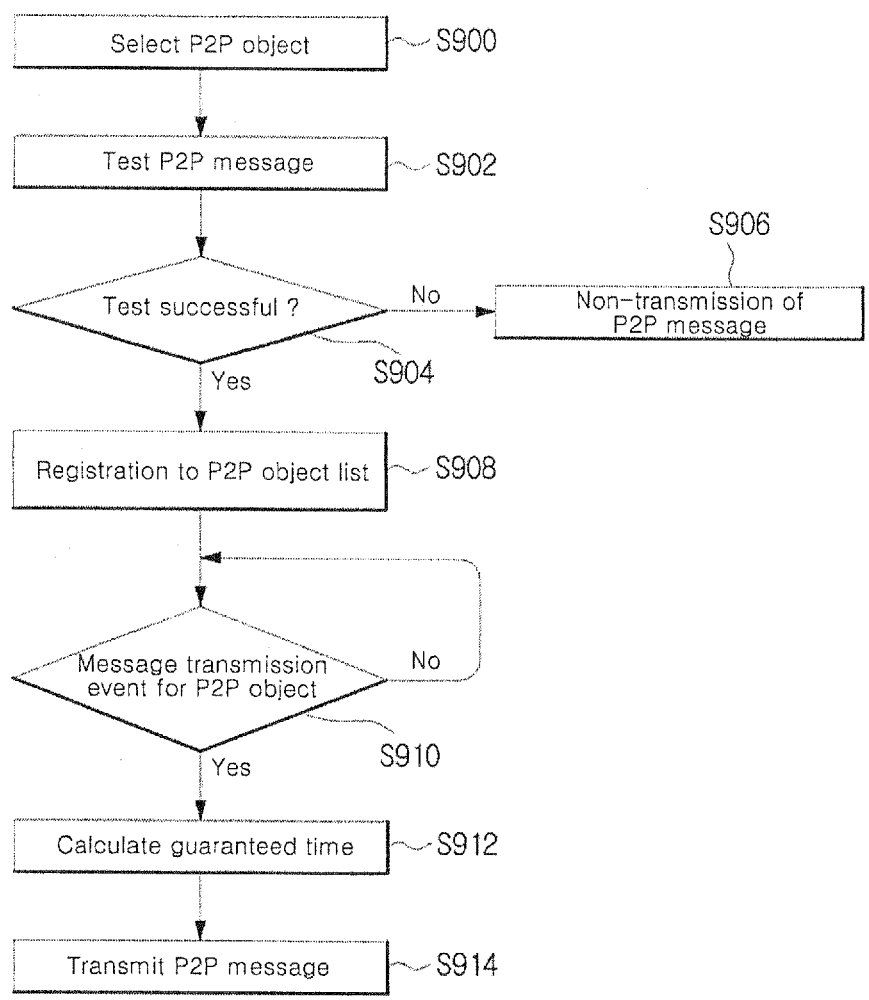
FIG. 9 is a flow chart illustrating a method for transmitting a P2P message in an online game according to one embodiment.

FIG. 9 is a flow chart illustrating a method for transmitting the P2P message in an online game according to one embodiment.

Referring to FIG. 9, the game application installed in the user client primarily selects the reception-object client which will receive the message using the P2P scheme at step S900. As described above, the P2P reception-object client can be selected using the location information of other user characters of the game.

If the P2P reception-object client has been primarily selected, it is determined whether the selected reception-object client is able to receive the P2P message at step S902. Thereafter, it is determined whether the test is successful or not at step S904. If it is determined that the P2P test for the reception-object client fails at step S904, the corresponding reception-object client is removed from the P2P reception-object list at step S906.

Otherwise, if the P2P test result for the reception-object client is successful at step S904, the corresponding reception-object client is finally registered in the P2P reception object list at step S908.

If an event for transmitting the P2P message to the P2P reception-object client occurs due to the movement of the transmission client character at step S910, the guaranteed time for the P2P message is calculated at step S912.

If the guaranteed time is calculated at step S912, the P2P message including the guaranteed time is created and is then transmitted to the P2P reception-object clients at step S914.

In order to provide the user with detailed information of moving situation information of the racing game, the P2P message may be transmitted to other user clients at intervals of a predetermined time earlier than a message-providing time of the game server 102 or the real-time message processing server 106.

Figure 10:
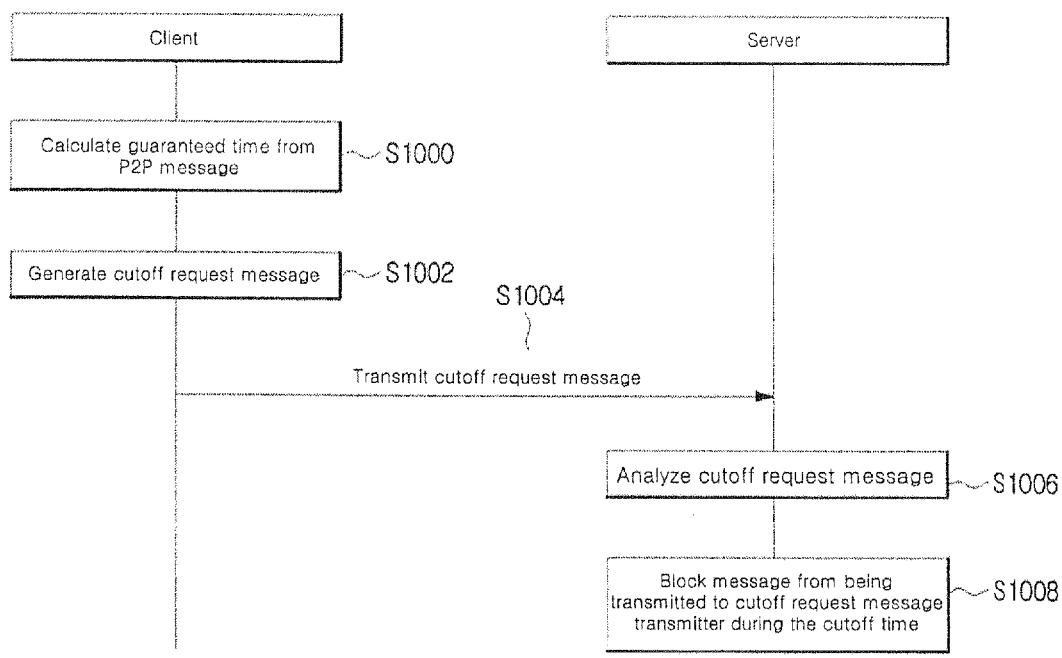
FIG. 10 is a flow chart illustrating a method for transmitting a cutoff request message to the server upon receiving the P2P message, and processing the cutoff request message in the server.

FIG. 10 is a flow chart illustrating a method for transmitting a cutoff request message to the server upon receiving the P2P message, and allowing the server to process the cutoff request message.

Referring to FIG. 10, when the P2P message is received, the game application installed in the client receiving the P2P message extracts transmission client information and guaranteed time information contained in the P2P message at step S1000.

After extracting the transmission client information and the guaranteed time information, the game application generates a cutoff request message (see FIG. 8) in which the extracted guaranteed time is set to a cutoff time at step S1002.

If the cutoff request message is generated, this cutoff request message is transmitted to the servers 102 and 106 at step S1004.

The player object of each server 102 or 106 having received the cutoff request message analyzes the cutoff request message, and extracts client information for blocking the message transmission and cutoff time information at step S1006.

The player objects 200 and 300 determine whether the transmission of the messages provided from the message controllers 206 and 304 should be blocked. If it is determined that the above-mentioned messages of the message controllers 206 and 304 are to be transmitted to the client for blocking the message transmission, the player object 200 and 300 blocks the transmission of the corresponding messages at step S1008.

As apparent from the above description, the P2P message transmission system exemplarily described above allows user clients to transmit/receive some parts of transmission messages of the game server, resulting in reduction of load of the game server.

Also, the P2P message transmission system exemplarily described above selects some messages needed to be real-time-processed, and enables the selected messages to be exchanged between user clients, so that the efficiency of using the P2P message in the multi-access online game is maximized.

Although the embodiments of the invention have been disclosed above for illustrative purposes, those skilled in the art will appreciate that various modifications, additions and substitutions are possible, without departing from the scope and spirit of the invention as disclosed in the accompanying claims.

What is claimed is:

1. A system for reducing a load of a game server associated with a multi-access online game, the system comprising:
a game server, being connected to a plurality user clients comprising a transmitting user client and a receiving user client, configured to receive game messages from the transmitting user client to process the received game messages associated with status change information of a game character corresponding to the transmitting user client according to a predetermined game logic; and
a database server configured to store the status change information,
wherein the game server is configured to receive a first message comprising first game information transmitted from the transmitting user client and to block transmission of the first message to the receiving user client in response to receiving a cutoff request from the receiving user client, the cutoff request message being generated by the receiving user client,
wherein upon receiving the first message, the receiving user client, is configured to determine a time for which the game messages are to be blocked by calculating guaranteed time information of the message of the first game information, and
wherein the transmission of the first message between the transmitting user client and the receiving user client is blocked, according to the guaranteed time information.

2. The system according to claim 1, wherein the game messages comprises a real-time game message, that is determined to be transmitted to the receiving user client in a real-time basis associated with the multi-access online game.

3. The system according to claim 2, wherein the multi-access online game comprises a racing game, and the message requiring immediate transmission comprises moving-messages and collision-messages of character cars of the racing game.

4. The system according to claim 1, wherein the game server comprises a player object that is configured to control the game messages transmitted and received between the transmitting user client and the receiving user client.

5. The system according to claim 2, further comprising:
a real-time message processing server configured to process the real-time game message for immediate transmission to the at least one of the user clients.

6. The system according to claim 1, wherein the game server is configured to transmit character location information of the at least one of the user clients to the one of the other multiple user clients.

7. A server comprising:
a processor configured to receive a game message from a transmitting user client and to process the received game message according to a game logic, wherein a database server is configured to store status change information of a game character corresponding to the transmitting user clients, wherein
the processor is further configured to receive a first message comprising first game information transmitted from the transmitting user client and to block transmission of a message comprising the first game information to a receiving user client in response to receiving a cutoff request being generated by the receiving user client, wherein upon receiving the first message, the receiving user client is configured to determine guaranteed time information of the first message, and wherein the transmission of the first message between the transmitting user client and the receiving user client is blocked, according to the guaranteed time information.

8. A method using a processor, the method comprising:

receiving a plurality of game messages from one or more user clients transmitting the game messages, the one or more of user clients comprising receiving user clients and transmitting user clients being connected to a game server via a network;

extracting transmission client information of the game messages to cutoff the transmission of the game messages and calculating guaranteed time information of the game messages, the calculation being performed by the receiving user clients;

generating, using the processor, a cutoff request message, the cutoff request message corresponding to the guaranteed time information;

transmitting the cutoff request message;

analyzing the cutoff request message and determining user clients for which the game messages are to be blocked, by extracting a cutoff time set to the calculated guaranteed time; and blocking transmission of the game messages from the transmitting user clients to the receiving clients, based on the calculated guaranteed time information.

9. A system comprising:

a plurality of clients represented by player objects;

a game server connected to the clients and configured to receive and to transmit game messages via the player objects from the clients, the clients comprising transmitting user clients and receiving user clients; and a real-time message server configured to determine the game messages comprising real-time game messages needed to be processed in a real-time basis and non-real-time messages, wherein the receiving user clients are configured to upon receiving the game messages, determine guaranteed time information of the game messages and to generate a cutoff request message, the cutoff request message corresponding to the guaranteed time information, wherein the game server is further configured to receive the game messages comprising the cutoff message transmitted from the receiving user clients and to analyze the cutoff request message to determine user clients for which the game messages are to be blocked, by extracting a cutoff time which is set to the calculated guaranteed time, and wherein the transmission of the game messages from the transmitting user clients to the receiving clients are blocked based on the guaranteed time information.

10. The system of claim 9, wherein the real-time message server is further configured to determine the real-time game messages needed to be processed in a real-time basis and to communicate the determined real-time messages between the transmitting user clients and the receiving user clients.

11. The system of claim 9, wherein the cutoff time is updated by the arrival of a new cutoff request message.

\* \* \* \* \*